United States Patent [19]

Asayama et al.

[11] Patent Number: 4,993,285
[45] Date of Patent: Feb. 19, 1991

[54] METHOD AND APPARATUS FOR CONTROLLING SPEED CHANGING UNIT

[75] Inventors: Yoshio Asayama; Makio Tsubota; Yasunori Okura; Takayuki Sato, all of Kanagawa, Japan

[73] Assignee: Kabushiki Kaisha Komatsu Seisakusho, Tokyo, Japan

[21] Appl. No.: 290,200

[22] PCT Filed: Apr. 11, 1988

[86] PCT No.: PCT/JP88/00364
§ 371 Date: Dec. 7, 1988
§ 102(e) Date: Dec. 7, 1988

[87] PCT Pub. No.: WO88/08094
PCT Pub. Date: Oct. 20, 1988

[30] Foreign Application Priority Data
Apr. 10, 1987 [JP] Japan .................. 62-88305

[51] Int. Cl.⁵ .............................. B60K 41/06
[52] U.S. Cl. ........................ 74/869; 74/335
[58] Field of Search .......... 74/336 R, 335, 745, 74/866-869

[56] References Cited

U.S. PATENT DOCUMENTS

| | | | |
|---|---|---|---|
| 4,324,153 | 4/1982 | Sugimoto | 74/866 |
| 4,411,174 | 10/1983 | Yokoi et al. | 74/866 |
| 4,690,017 | 9/1987 | Taniguchi et al. | 74/866 |
| 4,693,143 | 9/1987 | Harada et al. | 74/866 |
| 4,718,310 | 1/1988 | Shindo et al. | 74/869 X |
| 4,722,247 | 2/1988 | Shindo et al. | 74/867 X |
| 4,726,262 | 2/1988 | Hayakawa et al. | 74/866 |
| 4,730,519 | 3/1988 | Nakamura et al. | 74/866 |

FOREIGN PATENT DOCUMENTS

| | | | |
|---|---|---|---|
| 0028579 | 5/1981 | European Pat. Off. | 74/745 |
| 46-33049 | 9/1971 | Japan . | |
| 49-14658 | 4/1974 | Japan . | |
| 56-101445 | 8/1981 | Japan . | |
| 61-99745 | 5/1986 | Japan . | |

Primary Examiner—Dwight Diehl
Attorney, Agent, or Firm—Diller, Ramik & Wight

[57] ABSTRACT

The present invention is concerned with a transmission constructed in the two-staged structure including main speed changing units (1st, 2nd) and auxiliary speed changing units (H, L) which are provided with clutches (H, L 1st, 2nd) which in turn are individually connected to electronic type pressure control valves (21 and 24) so as to enable the respective clutches to be controlled separately. When it is found that pressurized hydraulic oil delivered from a hydraulic pump has a shortage in amount at the time of starting of forward movement of a vehicle, feeding of hydraulic oil to the clutches (H, L) on the main speed changing unit side and the clutches (1st, 2nd) on the auxiliary speed changing unit side is effected with a certain time difference kept therebetween in order to suppress fluctuation in filling time due to reduction of an amount of hydraulic oil delivered from the hydraulic pump.

11 Claims, 10 Drawing Sheets

—— COMMAND VALUE
----- HYDRAULIC PRESSURE FOR CLUTCHES

TRIGGER COMMAND
INITIAL PRESSURE COMMAND OF ELECTRICAL CURRENT

OVERSHOOT PRESSURE

DETECTING OF TERMINATION OF FILLING

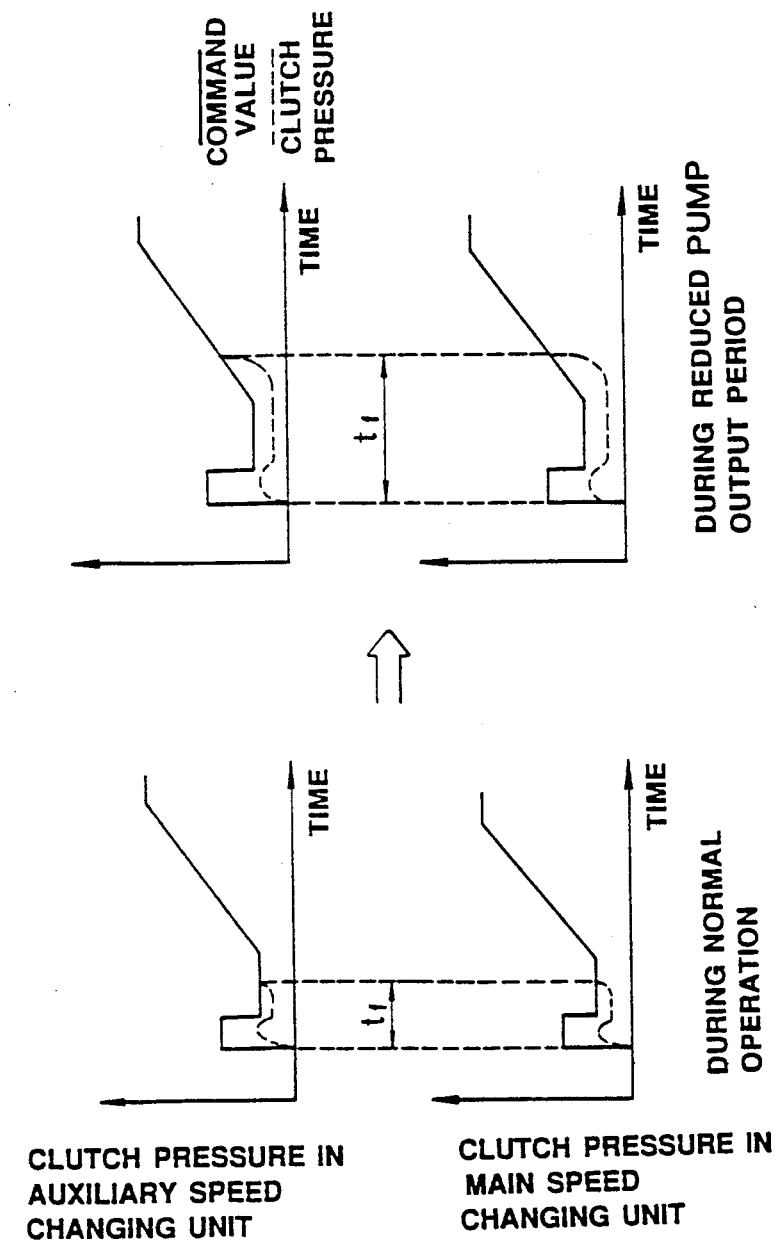

METHOD AND APPARATUS FOR CONTROLLING SPEED CHANGING UNIT

TECHNICAL FIELD

The present invention relates to a method and an apparatus for controlling a speed changing unit mounted on a moving machine, a construction machine or the like and more particularly to a method and an apparatus for suppressing fluctuation in filling time when an amount of hydraulic oil delivered from a hydraulic pump is reduced at the time of starting of forward movement or the like.

BACKGROUND ART

A speed changing unit of the type including clutches at a first stage (on the auxiliary speed changing side) and clutches at a second stage (on the main speed changing unit side) as viewed from an input shaft thereof is adapted to select a certain speed stage using a proper combination of clutches on the auxiliary speed changing unit side and clutches on the main speed changing unit side.

Hitherto, a speed changing unit of the aforementioned type is so constructed that clutches on the auxiliary speed changing unit side and clutches on the main speed changing unit side are simultaneously brought in an engaged state by simultaneously feeding hydraulic oil to them when speed changing is effected. Namely, when such a conventional system as mentioned above is employed, hydraulic oil is simultaneously fed to two clutches at the time of speed changing.

Thus, the conventional system has a drawback that hydraulic pressure of hydraulic oil delivered from the hydraulic pump is lowered due to a shortage in amount of hydraulic oil delivered therefrom compared with a capacity of the respective clutches when an amount of hydraulic oil delivered therefrom is reduced at the time of starting of forward movement, speed changing under the influence of inertia or the like occasion. As shown in FIG. 10, the lowering of hydraulic pressure of hydraulic oil delivered from the hydraulic pump causes delayed filling time and fluctuation in filling time, resulting in a variety of malfunctions such as generation of shock due to speed changing or the like taking place when filling is terminated, for instance, in the course of gradual increase of hydraulic pressure for the clutches in a case where the latter are intended to be controlled with the same pattern of hydraulic pressure.

Hence, the present invention has been made with the foregoing background in mind and its object resides in providing a method and an apparatus for controlling a speed changing unit which assure that a malfunction attributable to lowering of hydraulic pressure of hydraulic oil delivered from a hydraulic pump when an amount of hydraulic oil delivered therefrom is reduced at the time of starting of forward movement or the like is obviated.

DISCLOSURE OF THE INVENTION

The present invention consists in that when an amount of hydraulic oil delivered from the hydraulic pump does not reach a predetermined value and clutches to be brought in an engaged state are both of those on the auxiliary speed changing unit side and those on the main speed changing unit side, pressure control values corresponding to these clutches are controlled by way of the following steps.

First, the pressure control valves for clutches on the auxiliary speed changing unit side are actuated so as to allow pressurized hydraulic oil to be fed to them.

Next, it is confirmed that filling time is terminated with respect to the clutches on the auxiliary speed changing unit side.

Next, at the time point when it is confirmed that the aforementioned filling time is terminated, the pressure control valves relating to the clutches on the auxiliary speed changing unit side are controlled to gradually increase clutch pressure exerted on the clutches and the pressure control valves relating to the clutches on the main speed changing unit side are actuated so as to allow pressurized hydraulic oil to be fed to the clutches.

Finally, the termination of filling time is confirmed with respect to the clutches on the main speed changing unit side and the pressure control valves relating to the clutches are controlled to increase clutch pressure on the main speed changing unit side from the time point of the above confirmation.

According to the present invention which is concerned with a speed changing unit constructed in the two-staged clutch structure including a main speed changing unit and an auxiliary speed changing unit, since when it is found that hydraulic oil delivered from a hydraulic pump has a shortage in amount at the time of starting of forward movement or the like, hydraulic oil is fed to clutches on the main speed changing unit side and clutches on the auxiliary speed changing unit side, it is assured that fluctuation in filling time attributable to reduction of an amount of hydraulic oil delivered from the hydraulic pump can be suppressed whereby shock caused by speed changing can be reduced and stable speed changing can be achieved without any necessity for enlarging a capacity of the hydraulic pump.

BEST MODE FOR CARRYING OUT THE INVENTION

Now, the present invention will be described hereunder with reference to the accompanying drawings which illustrate preferred embodiments thereof.

Figure 2:
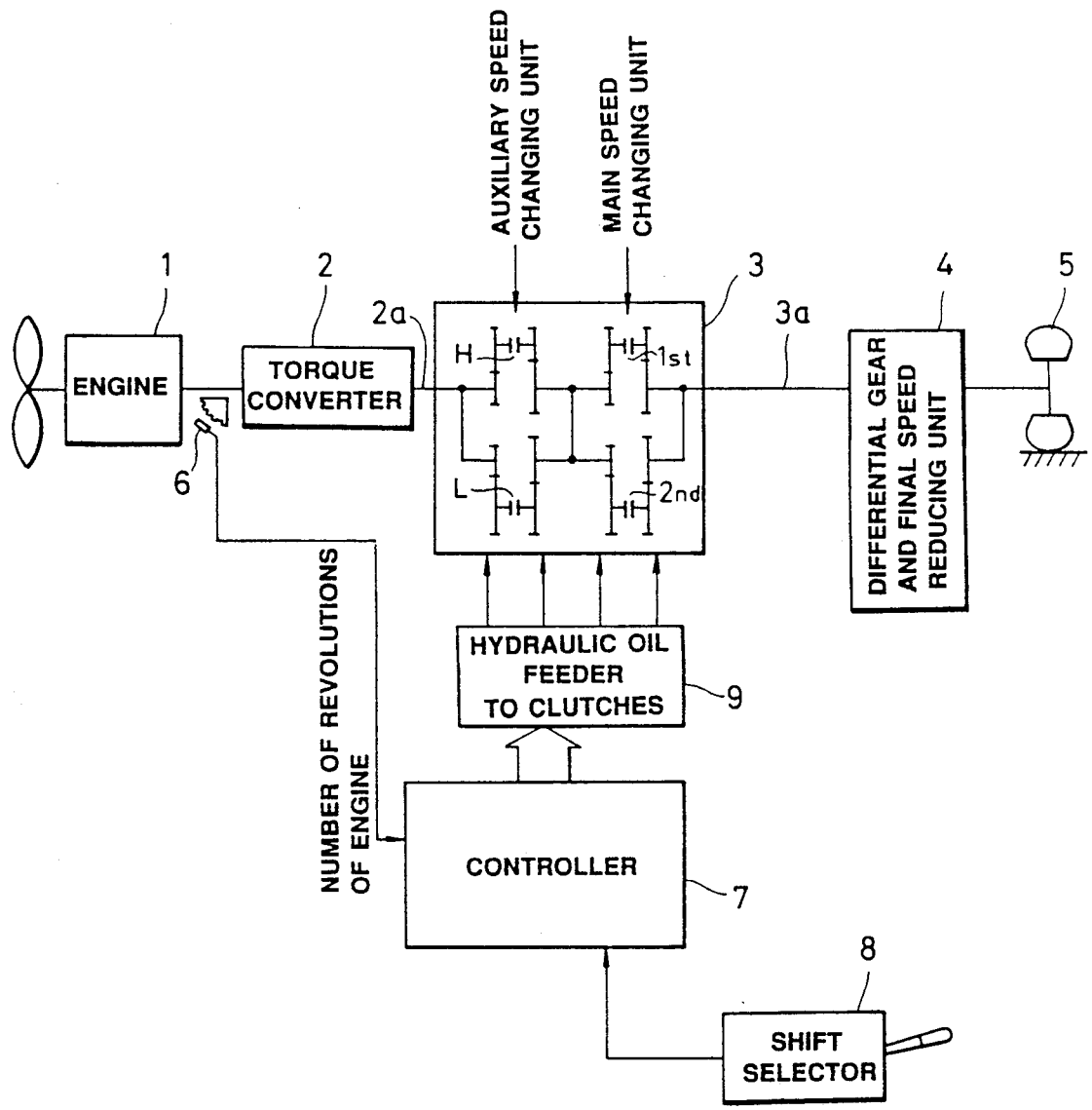
FIG. 2 is a block diagram schematically illustrating by way of example a control system to which the present invention is applied.

FIG. 2 is a view illustrating by way of example the structure of a system constituting a speed changing unit to which the present invention is applied.

Referring to FIG. 2, output from an engine 1 is transmitted to a transmission 3 via a torque converter 2 and output from the transmission 3 is then transmitted to a driving shaft 5 via a differential gear and a final speed reducing unit 4.

The engine 1 is equipped with an engine rotation sensor 6 adapted to output a signal corresponding to the number of revolutions thereof and an output from the engine rotation sensor 6 is inputted in a controller 7. The controller 7 is adapted to determine a magnitude of amount of hydraulic oil delivered from a hydraulic pump with reference to the output from the engine rotation sensor 6. In addition, a speed change command is inputted from a shift selector 8 to the controller 7.

The transmission 3 is provided with clutches H and L at a first stage (the clutches H and L being hereinafter referred to us clutches on the auxiliary speed changing unit side) operatively connected to an output shaft 2a of the torque converter 2 and clutches 1st and 2nd at a second stage (the clutches 1st and 2nd being hereinafter referred to as clutches on the main speed changing unit side) operatively connected to an output shaft 3a of the transmission 3, and a required speed changing stage is selected by a proper combination of the clutches H and L on the auxiliary speed changing unit side and the clutches 1st and 2nd on the main speed changing unit side.

Figure 3:
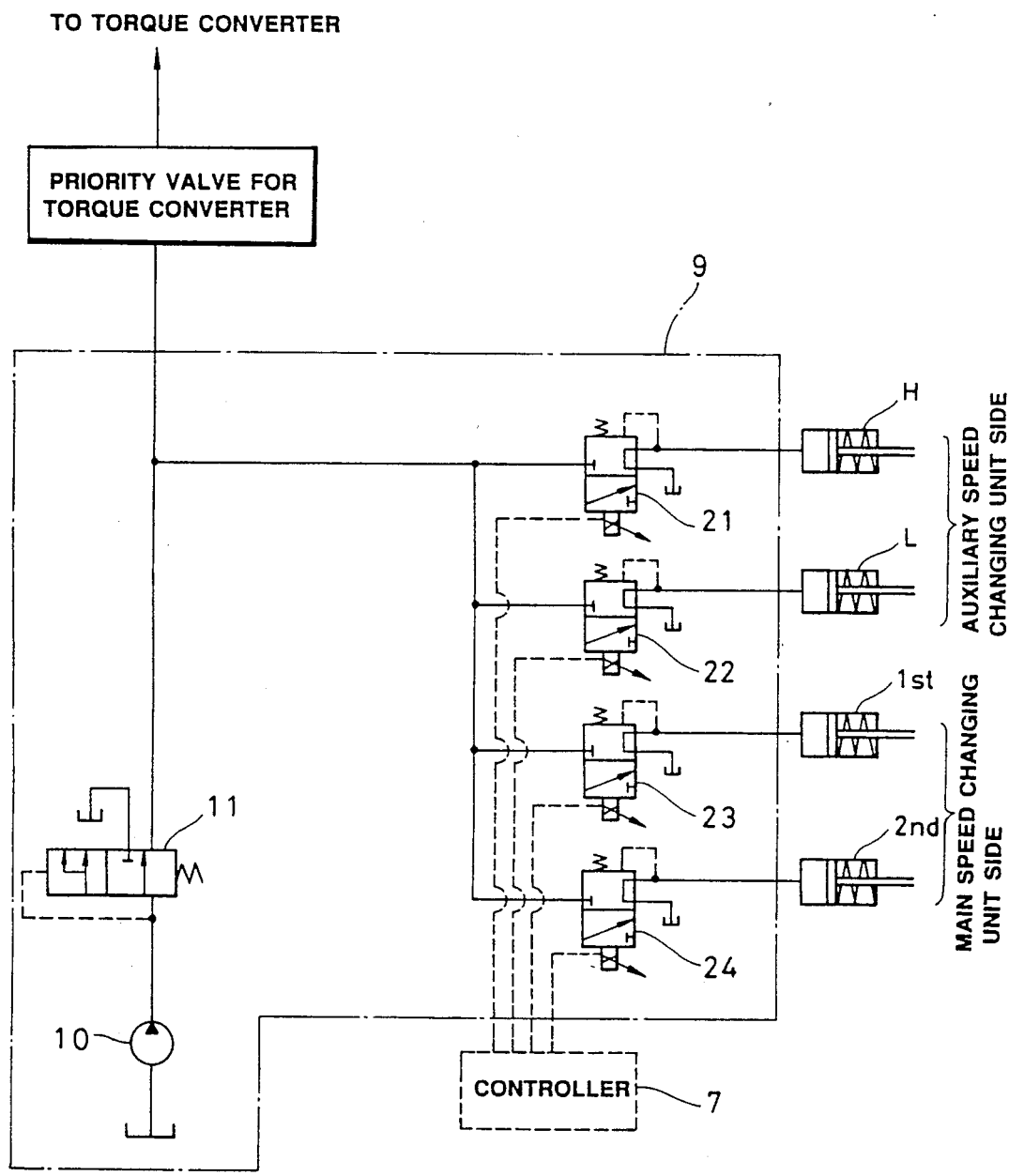
FIG. 3 is a hydraulic circuit diagram illustrating by way of example the inner structure of an apparatus for feeding hydraulic oil to clutches in the system in FIG. 2.

As shown in FIG. 3, an apparatus 9 for feeding pressurized hydraulic oil for these clutches is provided with a hydraulic pump 10 and a relief valve 11. Additionally, it is provided with a plurality of electronic type pressure control valves 21, 22, 23 and 24 for allowing hydraulic pressure to be exerted on the clutches H, L 1st and 2nd. The pressure control valves 21 to 24 are individually activated in response to an electrical signal from the controller 7.

Figure 4:
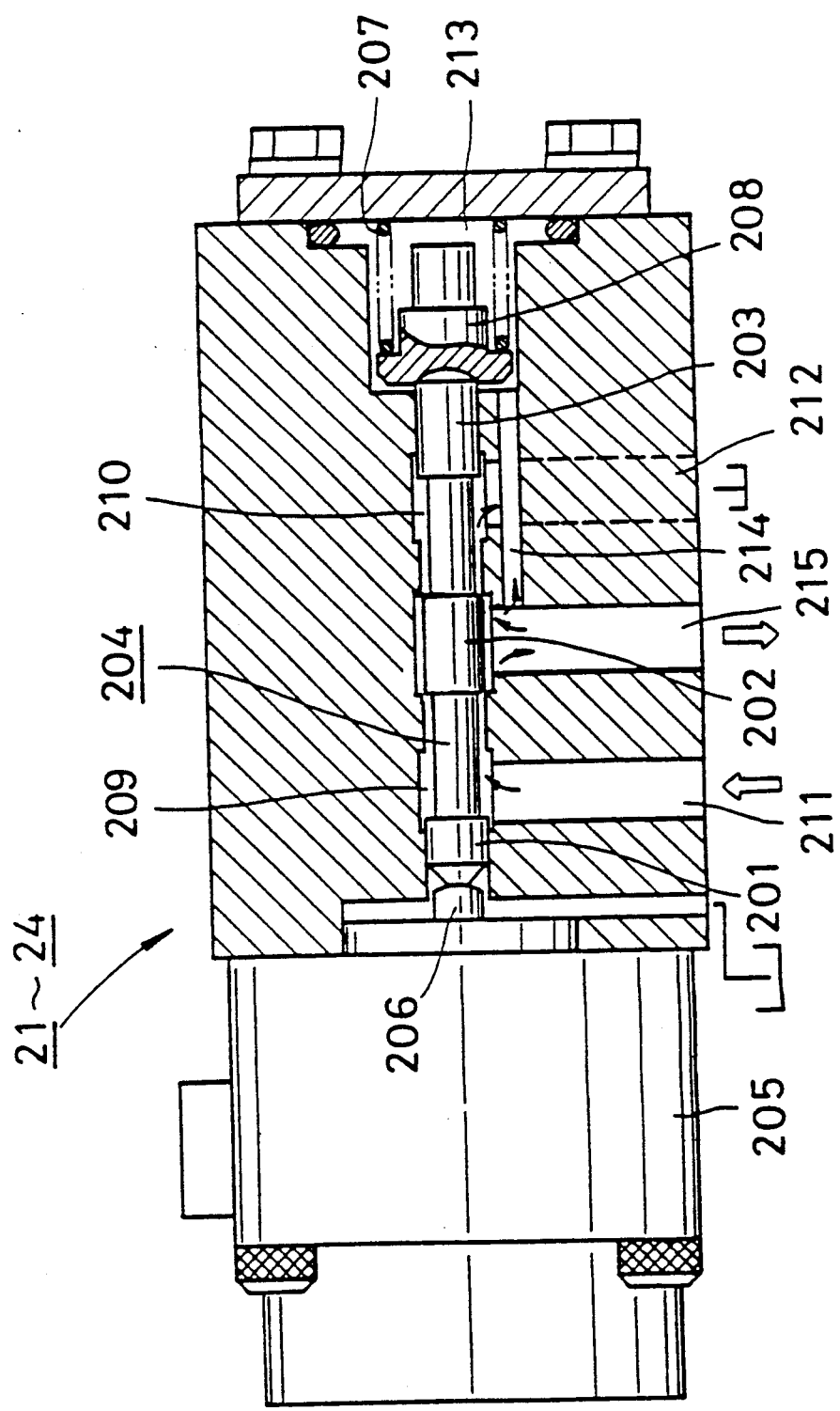
FIG. 4 is a sectional view illustrating by way of example the inner structure of a pressure control valve to be used for executing a first embodiment of the present invention.

FIG. 4 is a sectional view illustrating by way of example the structure of the respective pressure control valves 21 to 24. Specifically, each of the pressure control valves 21 to 24 includes a spool 204 comprising a first piston portion 201, a second piston portion 202 and a third piston portion 203. The left end of the spool 204 comes in contact with a plunger 206 of a proportional solenoid 205, while the right end of the same comes in contact with a retainer 208 which is energized in the leftward direction under the effect of resilient force of a coil spring 207.

A hydraulic chamber 209 is defined by a combination of the first piston portion 201 and the second piston portion 202, while a hydraulic chamber 210 is defined by a combination of the second piston portion 202 and the third piston portion 203. The hydraulic chamber 209 is formed with an inlet port 211 and the hydraulic chamber 210 is formed with a tank port 212.

A hydraulic chamber 213 in which the spring 207 and the retainer 208 are accommodated is communicated with an output port 215 via a hydraulic passage 214.

The proportional solenoid 205 is provided as an actuator serving to displace the spool 204 and its plunger 206 contacts the left end surface of the spool 204. The proportional solenoid 205 has a characteristic which is such that its thrust force is in proportion to an intensity of inputted electrical current.

While the illustrated operative state is maintained, the output port 215 is closed with the second piston portion 202.

Now, as the spool 204 is displaced in the rightward direction in response to activation of the proportional solenoid 205, hydraulic oil fed through the input port 211 is caused to flow in the output port 215. At this moment, a part of hydraulic oil passing through the output port 215 flows in the hydraulic chamber 213 via the hydraulic passage 214. At this moment, since hydraulic pressure of the hydraulic oil introduced into the hydraulic chamber 213 is exerted on the spool 204 to displace the latter in the leftward direction, the result is that the spool 204 is displaced in the leftward direction as hydraulic pressure in the hydraulic chamber 213 is increased. On displacement of the spool 204 in the leftward direction, flowing of hydraulic oil in the output port 215 is interrupted and at the same time hydraulic oil is drained to the tank port 212 side from the output port 215 side.

Thus, the spool 204 is actuated in such a manner that thrust force given by the plunger 206 is kept in a balanced state with force produced by hydraulic pressure in the hydraulic chamber 213.

Consequently, it follows that hydraulic pressure in the output port 215 is in proportion to an intensity of electrical current for activating the solenoid 205. This permits the controller 7 to be activated to generate a required intensity of hydraulic pressure to be transmitted to a pertinent clutch by properly controlling an intensity of driving electrical current to be applied to the respective solenoids of the pressure control valves 21 to 24. Incidentally, since the spring 207 has a small spring constant, function given by the spring is neglected in the foregoing description.

Figure 5:
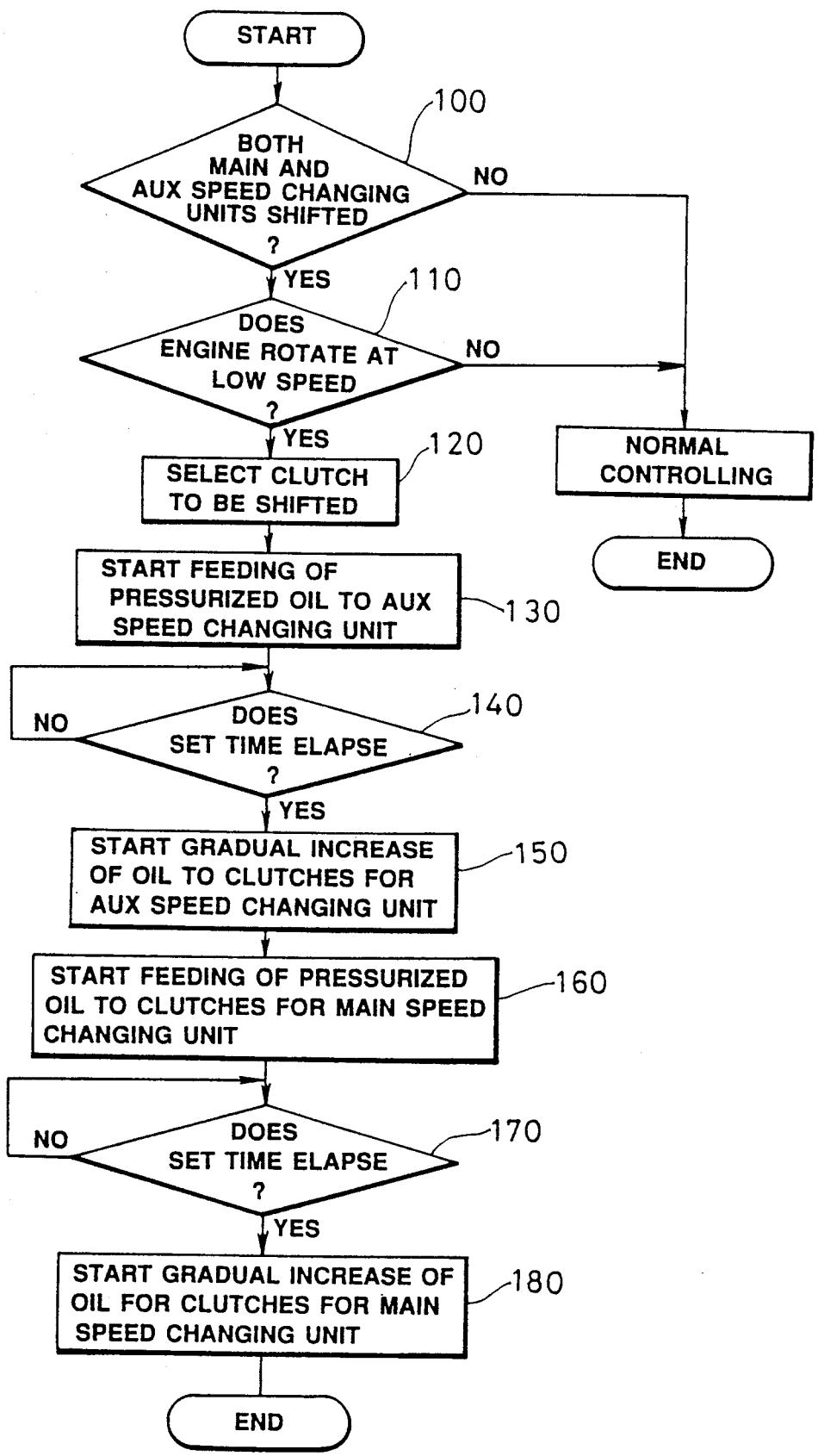
FIG. 5 is a flowchart illustrating by way of example concrete functions of the apparatus in accordance with the first embodiment of the present invention.

Next, concrete functions of the arrangement made in that way will be described below with reference to a flowchart in FIG. 5 and time charts in FIG. 1.

According to this embodiment, a suitable value of filling time is preset for each of the clutches by experiments or the like means so that the termination of filling is identified by the time point when a certain set period of time elapses after the starting of speed changing.

When speed changing or starting of forward movement is to be effected, the controller 7 first determines in response to an input signal transmitted from the shift selector 8 as to whether or not pertinent speed changing should be effected by shifting both the clutches on the main speed changing unit and the clutches on the auxiliary speed changing unit (step 100). Next, in a case where it is found that speed changing has been effected by shifting the clutches on both the sides, an output from the engine rotation sensor 6 is examined (step 110). In a case where it is found that the engine has the number of revolutions thereof less than a predetermined one, the controller 7 determines that an amount of hydraulic oil delivered from the hydraulic pump 10 has been reduced. Thereafter, the following controlling is effected for the respective clutches.

First, the controller 7 selects clutches to be shifted step 120).

In this case, the clutch L on the auxiliary speed changing unit side and the clutch 1st on the main speed changing unit side are brought in an engaged state.

Figure 1A:
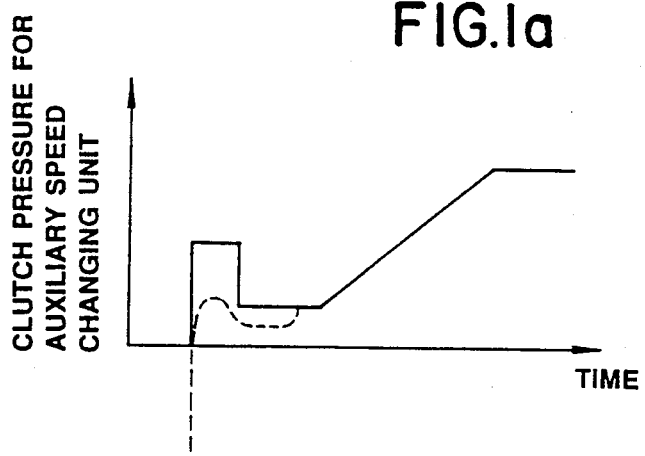
FIGS. 1a;1b are timing charts illustrating by way of example operation of an apparatus in accordance with an embodiment of the present invention.

The controller 7 is first activated to start feeding of hydraulic oil to the pressure control valve 22 for the clutch L on the auxiliary speed changing unit side and start operation of a timer (not shown) incorporated therein (step 130, time $t_1$ in FIG. 1). At this moment, the controller 7 added to the solenoid of the pressure control valve 22 for the clutch L a command value pattern as represented by a solid line in FIG. 1(a). With this command value pattern, the time when filling is terminated is hastened by initially allowing a large amount of hydraulic oil to flow in the clutch in response to a command having a high level and thereafter the initial pressure for bringing the clutch in an engaged state is maintained at a low level by reducing a command pressure to a lower level before the termination of filling so that undesirable shock appearing during speed changing is suppressed.

Figure 1B:
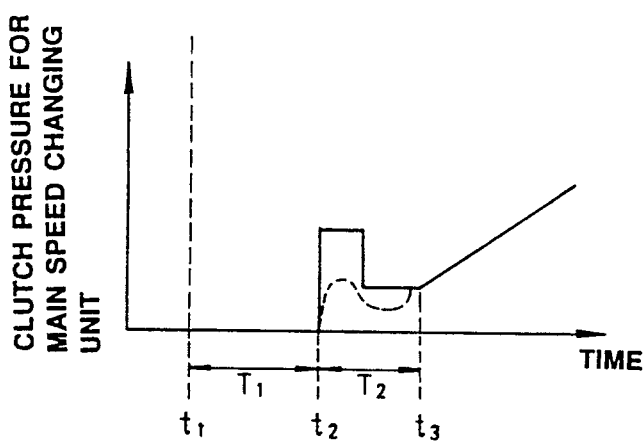

When the controller 7 recognizes later by means of the timer incorporated therein that a predetermined period of time $T_1$ set for the filling time of the clutch L on the auxiliary speed changing unit side has elapsed (step 140), gradual increase in hydraulic pressure of hydraulic oil to be fed to the clutch L on the auxiliary speed changing unit side is started at a time point $t_2$ (see FIG. 1) when the period of time $T_1$ has elapsed (step 150), at the same time feeding of hydraulic oil to the clutch 1st on the main speed changing unit side is started (step 160) and moreover operation of the timer is started. It should be noted that the same command value pattern as the foregoing one shown in FIG. 1(b) is given to the controller 7 also during controlling of hydraulic pressure for the clutch 1st. Thereafter, when a predetermined period of time $T_2$ set for the clutch 1st on the main speed changing side has elapsed (step 170), the controller 7 is activated in the same manner as mentioned above to start build-up of hydraulic pressure for the clutch 1st on the main speed changing unit side at a time point $t_3$ when the period of time $T_2$ has elapsed (step 180). Incidentally, in FIG. 1 a dotted line represents an actual hydraulic pressure for the respective clutches.

In this manner, according to the foregoing embodiment, in a case where the engine has the reduced number of revolutions thereof and the clutches on both the main and auxiliary speed changing unit sides are shifted in that way, hydraulic oil is first fed to the clutches on the auxiliary speed changing unit side and when a predetermined period of set time elapses later, gradual increase in hydraulic pressure for the clutches on the auxiliary speed changing unit side and feeding of hydraulic oil to the clutches on the main speed changing unit side are started whereby shifting is effected with a certain time difference kept between the main speed changing unit and the auxiliary speed changing unit. This assures that hydraulic oil delivered from the hydraulic pump is always fed to a single clutch, resulting in reduction of hydraulic pressure of hydraulic oil delivered from the hydraulic pump being suppressed. Consequently, a filling time can be shortened and uniformed and thereby stable and smooth speed changing can be achieved. Incidentally, in a case where the clutches are brought in an engaged state in accordance with the reverse order to the foregoing case of controlling, that is, clutch engaging is effected first on the main speed changing unit side and then on the auxiliary speed changing unit side, it follows that shock caused by speed changing is transmitted directly to the output shaft of the transmission 3 during a period of speed changing. Thus, the clutches on the auxiliary speed changing unit side are first brought in an engaged state and the clutches on the main speed changing unit side are then brought in an engaged state during the aforementioned period of controlling.

Next, description will be made below as to a second embodiment of the present invention.

According to this second embodiment, the termination of filling time for the respective clutches is detected by means of a filling detecting sensor disposed on each of the pressure control valves and controlling is then effected for the respective clutches on the basis of a output from the filling detecting sensor.

Figure 6:
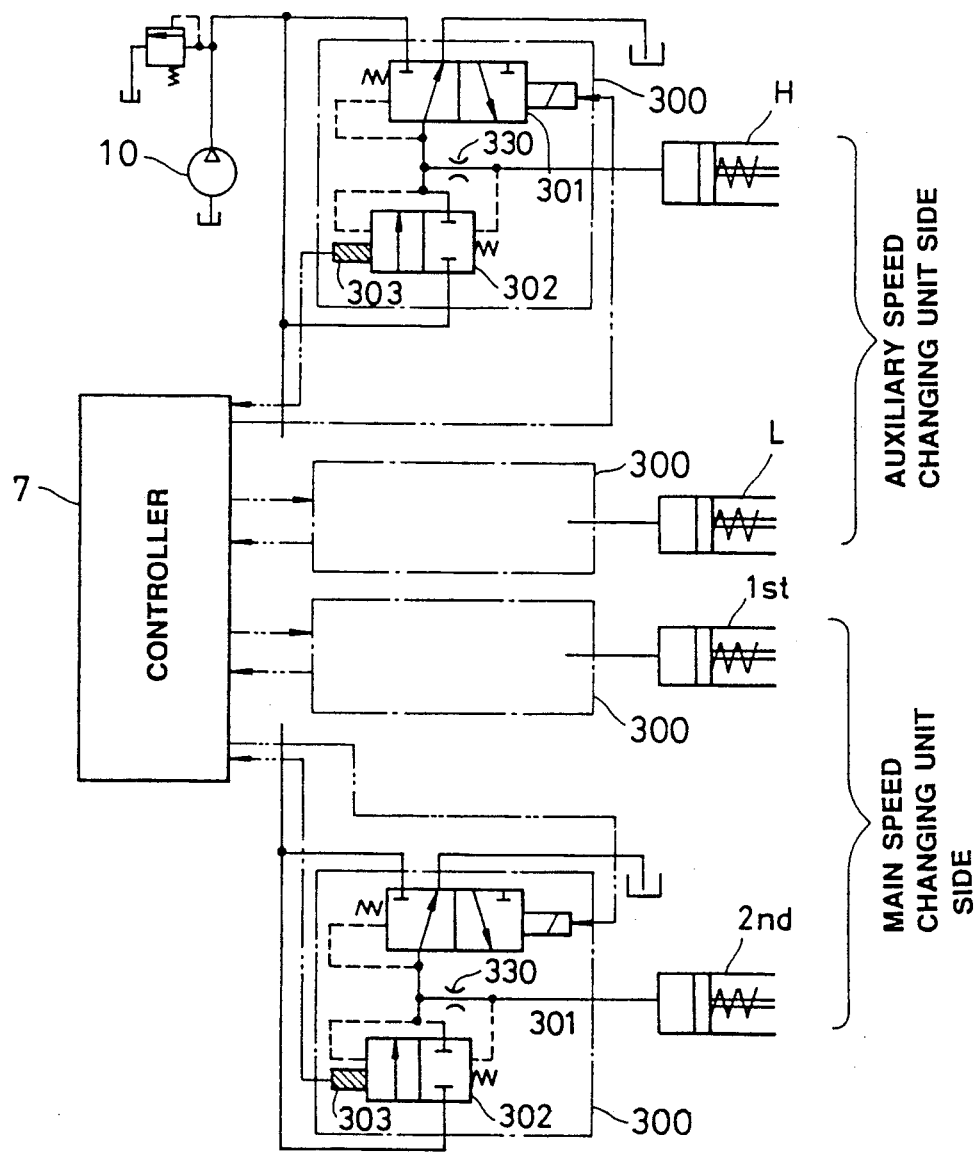
FIG. 6 is a hydraulic circuit diagram to be used for a second embodiment of the present invention.
Figure 7:
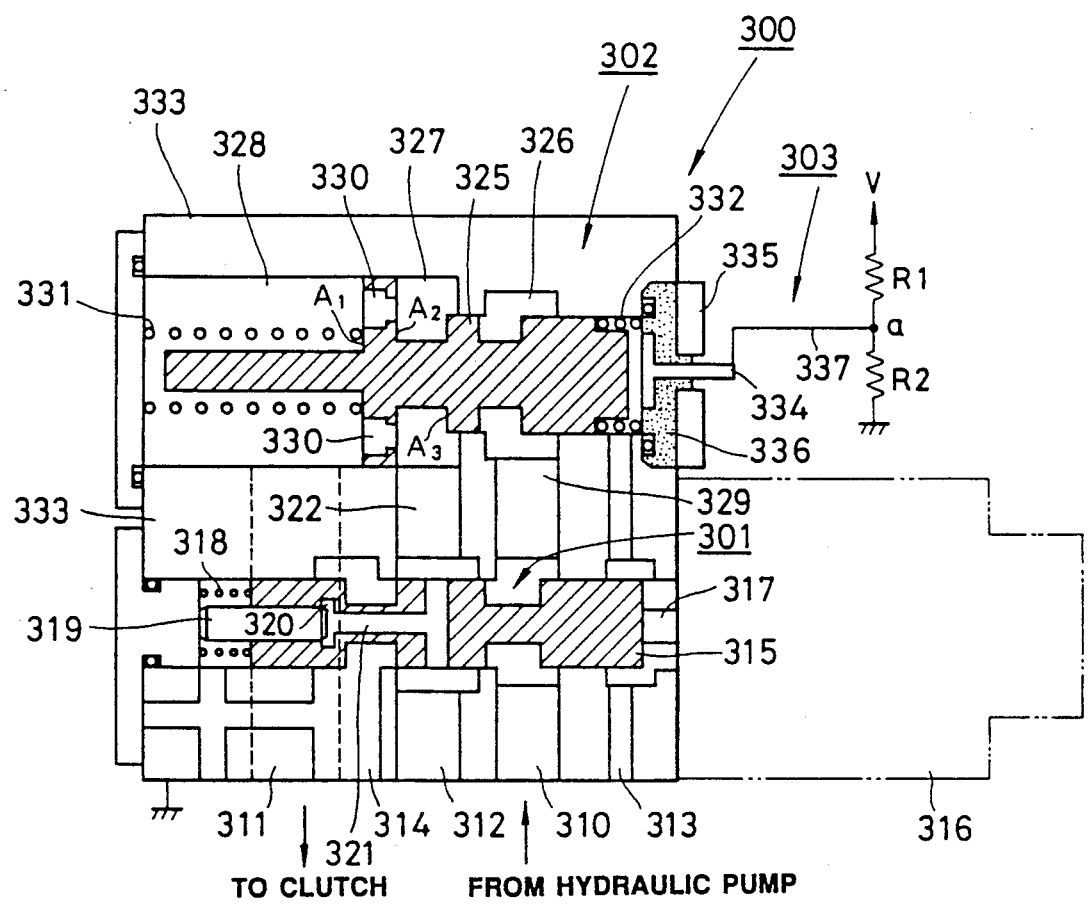
FIG. 7 is a sectional view illustrating by way of example the inner structure of a pressure control valve usable for clutches to be used for executing the second embodiment of the present invention, FIGS. 8a;8b;8c are time charts illustrating by way example functions of the pressure control valve in FIG. 7.

FIG. 6 is a hydraulic circuit diagram illustrating the second embodiment and FIG. 7 is a schematic view illustrating the structure of a valve 300 usable for the second embodiment. According to the second embodiment, the valve 300 shown in FIGS. 6 and 7 are used in place of the pressure control valves 21 to 24 shown in FIG. 4.

As is best seen in FIG. 7, the valve 300 for controlling hydraulic pressure for clutches comprises a pressure control valve 301, a flow rate controlling valve 302 and a sensor section 303 for detecting the termination of filling and hydraulic pressure for the respective clutches. The pressure control valve 301 is controlled by a controller 7 and a detected signal from the sensor section 303 is inputted in the controller 7.

Hydraulic oil delivered from a hydraulic pump which is not shown in the drawings is introduced into the valve 300 via an input port 310 and it is then fed to a pertinent clutch via an output port 311. A port 312 is kept closed and ports 313 and 314 are a drain port, respectively.

The electronic type pressure controlling valve 301 includes a spool 315 of which right end comes in contact with a plunger 317 of a proportional solenoid 316 and of which left end has a coil spring 318 attached thereto. A hydraulic chamber 320 is defined by a combination of the spool 315 and the piston 319 so that hydraulic pressure in a hydraulic passage 322 is fed back to the hydraulic chamber 320 via a hydraulic passage 321 formed in the spool 315.

On the other hand, the flow rate detecting valve 302 includes a spool 325 which defines a plurality of hydraulic chambers 326, 327 and 328. An orifice 330 is formed on the spool 325 between the hydraulic chambers 327 and 328. The spool 325 is designed to have three different pressure receiving ares $A_1$, $A_2$ and $A_3$ which establishes inequalities as represented by $A_1 + A_3 > A_2$ and $A_2 > A_3$ among them. A coil spring 331 is disposed at the left end of the spool 325, while another coil spring 332 is disposed at the right end of the same. When no hydraulic pressure prevails in the hydraulic chambers 327 and 328, the spool 325 assumes a position defined by free lengths of the springs 331 and 332, i.e. a neutral position as shown in FIG. 7. Namely, in this case, the spring 331 serves as a return spring for the spool 325 and the spring 332 serves as a spring for setting a pressure usable for detecting hydraulic pressure for the respective clutches.

A valve body 333 is provided with a detecting pin 334 made of metallic material at a position located on the upper right side which is intended for detecting further displacement of the spool 325 in the rightward direction against resilient force of the spring 332 from the neutral position as shown in FIG. 7. The detecting pin 334 is fitted to the valve body 333 using a cover 335 with an electrical insulating sheet 336 interposed therebetween. A lead wire 337 is extended from the detecting pin 334.

The lead wire 337 is connected to a point a between resistances $R_1$ and $R_2$ which are connected to one another in series. A predetermined magnitude of DC voltage V (for instance, 12 V) is applied to the resistances $R_1$ and $R_2$ and the valve body 333 is earthed.

The valve 300 having the sensor section 303 attached thereto is provided separately for the clutches at the respective speed changing stages.

Operation of the valve 300 as constructed in the above-described manner will be described below with reference to time charts shown in FIG. 8.

Figure 8A:
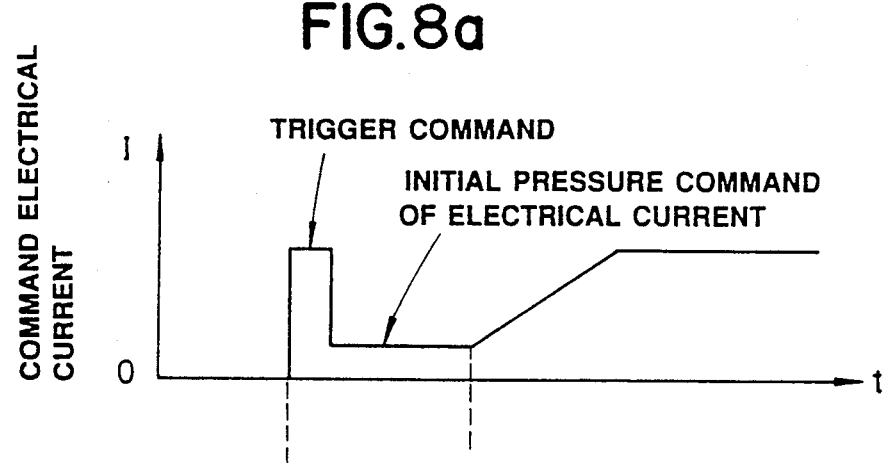
Figure 8B:
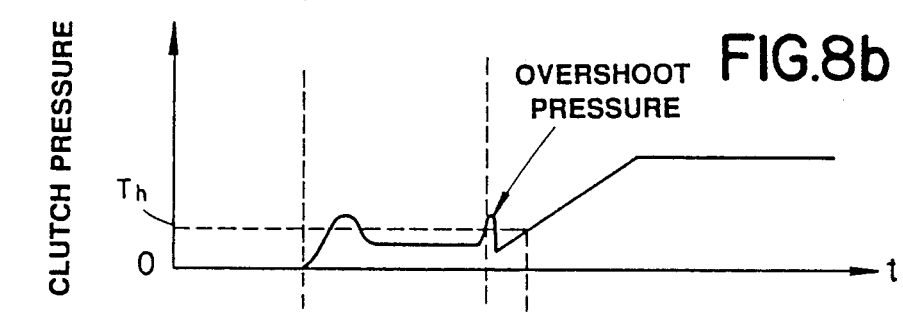
Figure 8C:
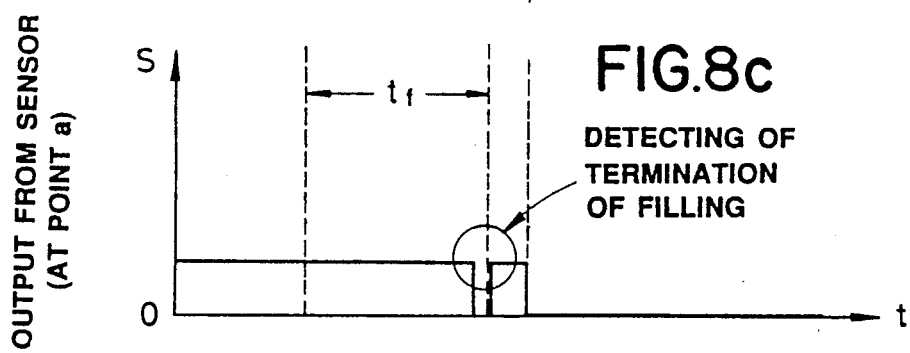

It should be noted that FIG. 8(a) shows a command electrical current I from the controller 7, FIG. 8(b) does a hydraulic pressure (clutch pressure) in the hydraulic chamber 328 and FIG. 8(c) does an output from the sensor section 303.

When it is required that a clutch at a pertinent speed changing state is brought in an engaged state, the controller 7 is so activated that a trigger command having a high level is inputted in a solenoid 316 for the valve 300, a command electrical current I is later lowered to a predetermined initial command electrical current corresponding to an initial hydraulic pressure for the clutches and it is then kept in a waiting state till the termination of filling while the foregoing operative state is maintained (see FIG. 8(a)).

In response to the trigger command inputted in that way, the spool 315 in the pressure control valve 301 is displaced in the leftward direction and hydraulic oil delivered from the hydraulic pump is caused to flow in the hydraulic chamber 327 in the flow rate detecting valve 302 via the input port 310 and the hydraulic passage 322. Hydraulic oil which has entered the hydraulic chamber 327 flows in the hydraulic chamber 328 via the orifice 330 and then it flows further in the clutch via the output port 311. At this moment, since a differential pressure appears between the hydraulic chambers 327 and 328 in the presence of the orifice 330, the spool 325 is displaced in the leftward direction.

As a result, the flow rate detecting valve 302 is kept opened and hydraulic oil which has been introduced into the hydraulic chamber 329 from the hydraulic pump flows in the hydraulic chamber 327 via the hydraulic chamber 326 and thereafter it is fed to a pertinent clutch via the orifice 330, the hydraulic chamber 328 and the output port 311. Feeding of hydraulic oil continues until the clutch pack is filled with hydraulic oil.

Here, when the spool 325 assumes the neutral position as shown in FIG. 7, it is parted away from the detecting pin 334 during a period of filling time $t_f$ in which the spool 325 is displaced leftward of the neutral position.

This permits a potential appearing at the point a in the foregoing operative state to assume a voltage value representative of the voltage V divided by the resistances $R_1$ and $R_2$ as shown in FIG. 8(c).

When the clutch pack is completely filled with hydraulic oil filling is terminated and hydraulic oil does not flow any more whereby the differential pressure across the orifice 330 disappears.

Consequently, the spool 325 is displaced in the rightward direction under the effect of force comprising return force of the spring 331 and force produced by a difference in pressure receiving area on the spool 325 as represented by $(A_1+A_3-A_2)$ added to the former.

While the spool 325 is returned in that way, hydraulic pressure of hydraulic oil delivered from the hydraulic pump is added to clutch pressure via the hydraulic passage 329, the hydraulic chamber 327, the orifice 330 and the hydraulic chamber 328, resulting in overshoot pressure as shown in FIG. 8(b) being generated.

Here, it should be noted that the spring 332 has a spring constant which is set to a pressure value Th smaller than the overshoot pressure, as shown in FIG. 8(b).

Thus after the spool 325 is displaced in the rightward direction to the neutral position shown in FIG. 7 during its return movement, it is displaced further in the rightward direction by the aforementioned overshoot pressure against energizing force of the spring 332 until its right en surface comes in contact with the detecting pin 334.

This causes the detecting pin 334 to be electrically conducted to the earthed valve body 333 via the spool 325 whereby the potential at the point a is lowered to a level of zero as shown in FIG. 8(c) and no voltage appears at the point a.

The potential at the point a is inputted in the controller 7 so that the latter determines the termination of filling by rising of the potential at the point a. Once the termination of filling has been determined, the controller 7 is immediately activated to gradually increase the command electrical current I to be conducted to a pertinent clutch from the value indicative of initial pressure command electrical current (see FIG. 8(a)).

Consequently, a clutch pressure of the pertinent clutch is lowered from the aforementioned value of overshoot pressure and thereafter it is gradually increased, as shown in FIG. 8(b). This causes the spool 325 to be once displaced in the leftward direction to the neutral position from the operative state in which it contacts the detecting pin 334. Thereafter, the clutch pressure is gradually increased so that it exceeds the pressure Th set for the spring 332 at a certain time point. As a result, the spool 325 is displaced in the rightward direction again against energizing force of the spring 332 so that its right end surface comes in contact with the detecting pin 334.

This allows the potential at the point a to be lowered to a level of zero again and thereafter this zero level is maintained.

Namely, since the potential at the point a becomes zero when pressure higher than the set pressure Th prevails in the clutch and it assumes a predetermined value of voltage when clutch pressure is reduced less than the set pressure Th, the controller 7 can not only detect the termination of filling but also can know presence or absence of the clutch pressure, that is, whether the pertinent clutch is brought in an engaged state or not, by monitoring the potential at the point a.

Figure 9:
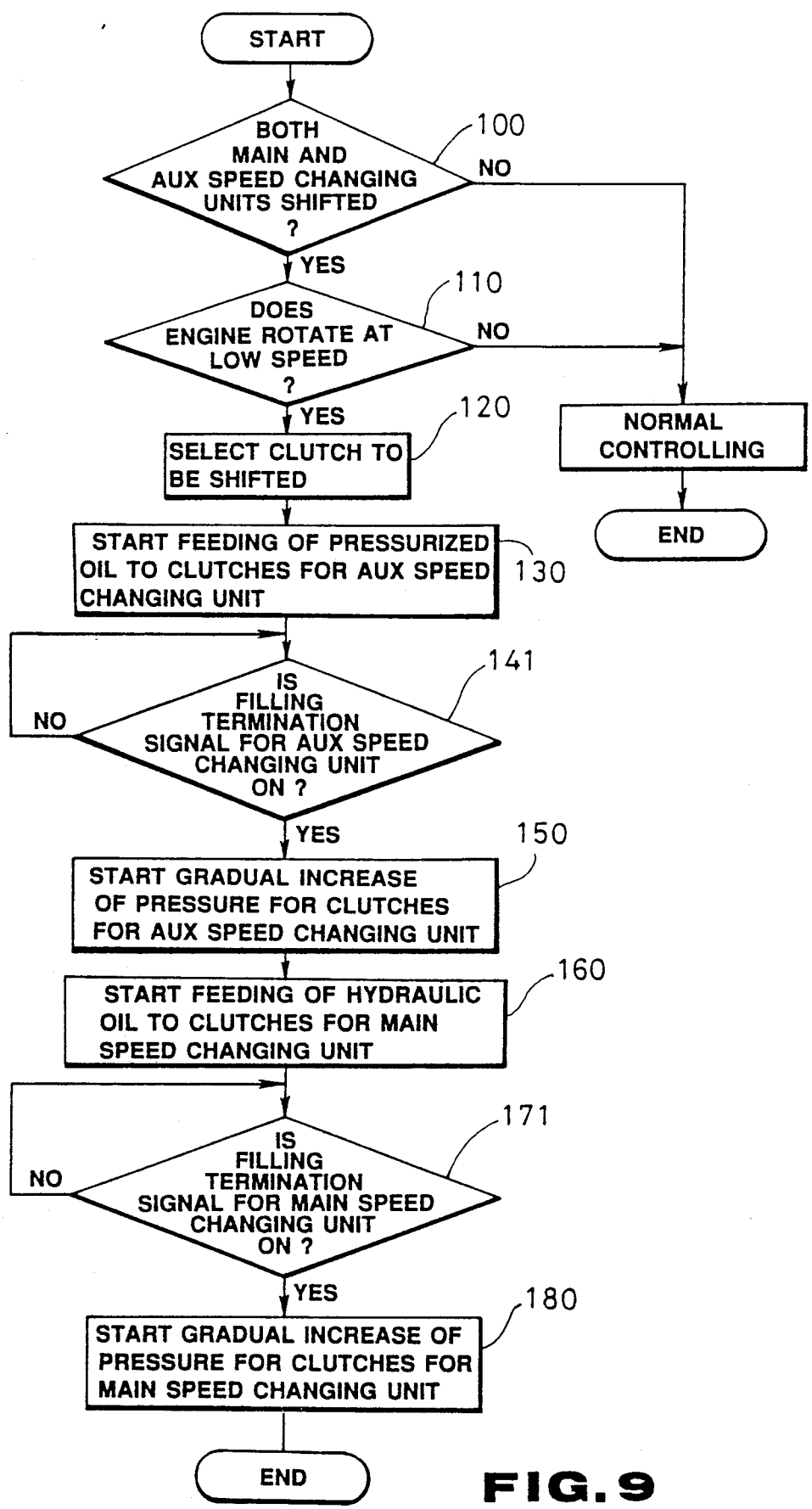
FIG. 9 is a flowchart illustrating by way of example concrete function of the apparatus in accordance with the second embodiment of the present invention, and FIG. 10a; 10b are time charts illustrating a conventional system.

In a case of such valve construction including the filling detecting sensor 303 as mentioned above, speed changing control as shown in FIG. 9 representative of a flowchart can be carried out. Specifically, the flowchart shown in FIG. 9 is such that the steps 140 and 170 involved in the flowchart of FIG. 5 are replaced with steps 141 and 171 in order to assure that the termination of filling is detected on the basis of an output from the filling detecting sensor which is fitted to a valve for the respective clutches.

Specifically, according to the second embodiment, in a case where conditions as represented by steps 100 and 110 are established in the same manner as in the first embodiment, the controller 7 is activated to first start feeding of hydraulic oil to clutches on the auxiliary speed changing unit side and then start gradual increasing of hydraulic pressure to be transmitted to the clutches on the auxiliary speed changing unit side as well as feeding of hydraulic oil to clutches on the main speed changing unit side when signal indicative of the termination of filling is inputted therein from sensors 303 on valves which are communicated with the clutches on the auxiliary speed changing unit side. Thereafter, when signal indicative of the termination of filling is inputted in the controller 7 from sensors 303 on valves communicated with clutches on the main speed changing unit side, gradual increasing of hydraulic pressure to be transmitted to the clutches on the main speed changing side is started from this time point.

Since the second embodiment is executed such that controlling is effected in accordance with an output from the respective filling detecting sensors, it is assured that speed changing control can be carried out more precisely than in the first embodiment.

Incidentally, in the foregoing embodiments, an amount of hydraulic oil delivered from the hydraulic pump is determined from the number of revolutions of the engine. However, the present invention should not be limited only to this. Alternatively, any other method, for instance, a method of detecting an amount of hydraulic oil delivered from the hydraulic pump directly by a flow rate sensor may be employed.

In addition, the present invention may be applied either to a manual speed changing type vehicle or an automatic speed changing type vehicle.

Additionally, in the foregoing embodiments, the present invention is applied to a speed changing unit of the type including an auxiliary speed changing unit at the first stage and a main speed changing unit at the second unit. Alternatively, the present invention may be applied to a speed changing unit of the type additionally including an auxiliary speed changing unit at the third stage and those at the later stages. In this case, it is required that respective clutches are brought in an engaged state in accordance with the successive order with a certain time difference kept between adjacent stages.

INDUSTRIAL APPLICABILITY

The present invention is advantageously applicable to an apparatus for controlling a speed changing unit of the type comprising a main speed changing unit and an auxiliary speed changing unit wherein a transmission mounted on a construction machine such as dump truck, wheel loader or the like vehicle or a passenger car is constructed at least in a two-staged structure including clutches for the main speed changing unit and clutches for the auxiliary speed changing unit.

We claim:

1. An apparatus for controlling a speed changing unit comprising:
    a transmission including a plurality of auxiliary speed changing clutches at a first stage and a plurality of main speed changing clutches at a second stage as viewed from an input shaft of said transmission,
    a plurality of pressure control valves individually connected to the plural clutches in the transmission to generate in a pertinent clutch a hydraulic pressure corresponding to an electrical command inputted therein,
    a hydraulic pump for feeding pressurized hydraulic oil to said plural pressure control valves,
    means for detecting an amount of hydraulic oil delivered from said hydraulic pump,
    means for determining, during speed changing, whether clutches to be engaged comprise both an auxiliary speed changing clutch and a main speed changing clutch and also determining whether an output from said means for detecting an amount of hydraulic oil delivered by the hydraulic pump is below a predetermined value, and
    means selecting an auxiliary clutch and a main clutch corresponding to a desired speed stage during speed changing and for controlling respective pressure control valves corresponding to the auxiliary speed changing clutch and the main speed changing clutch thus selected in such a manner that when results derives from determinations made by said determining means are identified as yes, feeding of hydraulic oil to the auxiliary speed changing clutch thus selected is first started, and thereafter feeding of pressurized hydraulic oil to the main speed changing clutch thus selected and gradual increasing of clutch pressure of the auxiliary speed changing clutch thus selected are started at the time point when a predetermined period of time has elapsed.

2. An apparatus for controlling a speed changing unit as claimed in claim 1, characterized in that said means for detecting an amount of hydraulic oil delivered from the hydraulic pump detects the number of revolutions of an engine and then determines an amount of hydraulic oil delivered from the hydraulic pump on the basis of the detected number of revolutions of the engine.

3. An apparatus for controlling a speed changing unit comprising:
    a transmission including a plurality of auxiliary speed changing clutches at a first stage and a plurality of main speed changing clutches at a second stage as viewed from an input shaft of said transmission,
    a plurality of pressure control valves individually connected to said plural clutches in the transmission to generate in a pertinent clutch a hydraulic pressure corresponding to an electrical signal inputted therein,
    a hydraulic pump for feeding pressurized hydraulic oil to said plural pressure control valves,
    means for detecting an amount of hydraulic oil delivered from said hydraulic pump,
    a plurality of means associated with the plural clutches for detecting the termination of filling of a respective clutch with hydraulic oil,
    means for determining, during speed changing, whether clutches to be engaged comprise both an auxiliary speed changing clutch and a main speed changing clutch and also determining whether an output from said means for detecting an amount of hydraulic oil by the hydraulic pump below a predetermined value, and
    means selecting an auxiliary clutch and a main clutch corresponding to a desired speed stage during speed changing and for controlling the respective pressure control valves corresponding to the auxiliary speed changing clutch and the main speed changing clutch thus selected in such a manner that when results derived from determinations made by said determining means are identified as yes, feeding of hydraulic oil to the auxiliary speed changing clutch thus selected is first started, and thereafter feeding of hydraulic oil to the main speed changing clutch thus selected and gradual increasing of clutch pressure for the auxiliary speed changing clutch thus selected are started at the time point when the termination of filling of the auxiliary speed changing clutch is detected by an output from said filling detecting means.

4. An apparatus for controlling a speed changing unit as claimed in claim 7, characterized in that each of the plural pressure control valves comprises;
  a first valve including a spool having an orifice formed at an output port leading to a pertinent clutch, said first valve being opened under the effect of differential pressure appearing across said orifice and it being closed under the effect of return force of a first spring disposed at one end of said spool, and
  a second valve in the form of a pressure control valve adapted to be actuated in response to an electrical signal to open the first valve be feeding hydraulic oil from the hydraulic pump to the first valve and gradually increase hydraulic pressure for said clutch after the termination of filling.

5. An apparatus for controlling a speed changing unit as claimed in claim 8, characterized in that said filling detecting means comprises:
  a second spring disposed on another end of the spool of the first valve, and
  means for detecting the termination of filling on the basis of a movement of the spool of the first valve against resilient force of said second spring.

6. An apparatus for controlling a speed changing unit as claimed in claim 5, characterized in that the second spring has a spring constant which is smaller than a spring constant of the fist spring.

7. An apparatus for controlling a speed changing unit as claimed in claim 5, characterized in that the second spring has a spring constant which is set larger than an initial pressure for a pertinent clutch on the termination of filling and smaller than an overshoot pressure which is generated when the spool of the first valve is closed in response to the termination of filling.

8. An apparatus for controlling a speed changing unit as claimed in claim 5, characterized in that said detecting means is adapted to detect the termination of filling on an initial movement of the spool against resilient force of the second spring after a speed changing command is produced.

9. An apparatus for controlling a speed changing unit as claimed claim 5, characterized in that said detecting means includes a member secured to a valve body and means for detecting contacting of the spool of the first valve with said member and separation of the former away from the latter.

10. An apparatus for controlling a speed changing unit as claimed in claim 9, characterized in that said member is an electrical conductive detecting pin secured to the valve body with an electrical insulating material interposed therebetween and said contact and non-contact detecting means is adapted to detect contacting of the member with the spool of the first valve and separation of the former away from the latter in the form of an electrical ON or OFF signal.

11. An apparatus for controlling a speed changing unit as claimed in claim 10, characterized in that said contact and non-contact detecting means includes means for applying a predetermined magnitude of voltage to said detecting pin and means for detecting a voltage appearing on the detecting pin in response to contacting of the member with the valve spool of the first valve and separation of the formed away from the latter.

* * * * *